(12) United States Patent
Niimi et al.

(10) Patent No.: US 6,527,249 B2
(45) Date of Patent: Mar. 4, 2003

(54) ELECTROMAGNETIC VALVE

(75) Inventors: Shigeki Niimi, Kariya (JP); Masahiro Yoshida, Chiryu (JP); Kazuhiro Matsukawa, Nishio (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/864,209

(22) Filed: May 25, 2001

(65) Prior Publication Data

US 2001/0052584 A1 Dec. 20, 2001

(30) Foreign Application Priority Data

May 26, 2000 (JP) ........................................ 2000-156951

(51) Int. Cl.$^7$ .............................................. F16K 31/02
(52) U.S. Cl. .............................. 251/129.15; 137/625.69
(58) Field of Search ...................... 251/129.15, 129.01, 251/129.19; 137/625.69, 625.65

(56) References Cited

U.S. PATENT DOCUMENTS

| | | | |
|---|---|---|---|
| 3,790,129 A | * 2/1974 | Pauls ........................ 251/297 |
| 4,563,664 A | * 1/1986 | Chin et al. .................. 335/262 |
| 4,971,116 A | * 11/1990 | Suzuki et al. .......... 137/625.65 |
| 5,167,442 A | * 12/1992 | Alaze et al. ............ 251/129.02 |
| 5,215,294 A | * 6/1993 | Muramatsu et al. ... 267/140.13 |
| 5,556,175 A | * 9/1996 | Hayakawa et al. .... 251/129.02 |
| 5,794,577 A | * 8/1998 | Kira ........................ 123/90.17 |
| 5,856,771 A | * 1/1999 | Nippert .................. 251/129.15 |
| 5,871,201 A | * 2/1999 | Cornea et al. ......... 251/129.15 |
| 6,105,616 A | * 8/2000 | Sturman et al. ....... 137/625.65 |
| 6,155,654 A | * 12/2000 | Oyama .................. 251/129.15 |
| 6,179,005 B1 | * 1/2001 | Inami ..................... 137/625.65 |

\* cited by examiner

Primary Examiner—Gene Mancene
Assistant Examiner—John Bastianelli

(57) ABSTRACT

An electromagnetic valve comprises a case having a cylindrical portion, a yoke having a large diameter portion and a small diameter portion, and a sleeve having at least two ports and receiving a valve member therein so as to perform reciprocating motion. The large diameter portion of the yoke is fluid-tightly pressed into the inner circumferential surface of the cylindrical portion of the case, and the inner circumferential surface of the sleeve is fluid-tightly pressed onto the outer circumferential surface of the small diameter portion of the yoke.

1 Claim, 2 Drawing Sheets

ELECTROMAGNETIC VALVE

The present application is based on and claims priority under 35 U.S.C. § 119 with respect to Japanese Patent application No. 2000-156951 filed on May 26, 2000, the entire content of which is incorporated herein by reference.

FIELD OF THE INVENTION

The present invention is directed to an electromagnetic valve and in particular to an electromagnetic valve which can switch a flow passage of fluid or which can control flow rate of fluid.

BACKGROUND OF THE INVENTION

A conventional electromagnetic valve of this kind is disclosed, for example, in Japanese Laid-open Publication No. Hei. 11-2354. This valve is the so-called linear type electromagnetic valve. Namely, the amount of the current supplied to a coil is controlled and thereby the axial position of a spool disposed in a sleeve performing reciprocating motion is controlled continually or without any steps. In this valve, the stepped configuration is processed on an inner circumference of the end of a cylindrical case and a thin portion is formed thereon. A yoke having an outer diameter portion with a diameter substantially the same as the inner diameter of the thin portion and the sleeve is inserted into the thin portion in order. Then, an excess portion of the thin portion which is projected in the axial direction is riveted inward in the diametrical direction and the yoke and the sleeve are secured to the main body of the electromagnetic valve.

Japanese Laid-open Publication No. Hei. 11-118063 also discloses a linear type electromagnetic valve. In this valve, as same as the above mentioned valve, a sleeve having an outer diameter portion with a diameter substantially the same as the inner diameter of a thin portion of the cylindrical case is inserted into the thin portion. Then, an excess portion of the thin portion, which is projected in the axial direction, is riveted inward in the diametrical direction and the sleeve is secured to the main body of the electromagnetic valve.

In the above mentioned valves, the process for forming the stepped configuration having the thin portion on inner circumference of the case is required for riveting the sleeve and so on. Therefore, the manufacturing or processing cost of the valve is increased. Further, the fact that the riveting cannot make the securing portion between the case and the sleeve and so on has a sealing function. Therefore, it is necessary to provide an additional seal number such as a seal ring for preventing the fluid from leaking to the outside of the valve and for preventing the water or dust from entering into the inside of the valve. As a result, the costs of parts and the costs for assembling the valve are increased.

Further, in the electromagnetic valve with the above-mentioned sleeve, the outer diameter of the main body of the valve is generally larger than the outer diameter of the sleeve. Therefore, it is necessary to provide at the and of the sleeve a flange portion whose diameter is substantially the same as the inner diameter of the thin portion. On the other hand, the roughness of the outer circumferential surface of the sleeve on which at least two ports are formed has to be finished by grinding or other methods in order to seal the ports with a member for receiving the sleeve. It is desirable to use an outer circumference centerless method which is cheap for grinding the outer circumferential surface of the sleeve. In order to use such a method, it is necessary that the outer diameter of the outer circumferential surface of the sleeve for grinding is the largest diameter of the sleeve in the axial direction. If the sleeve has a flange portion with a diameter larger than the outer diameter of the outer circumferential surface of the sleeve for grinding, it is not possible to use the outer circumference center-less method. The cost for grinding process is therefore increased. Accordingly, an electromagnetic valve which is cheap and easy to assemble is requested.

SUMMARY OF THE INVENTION

It is, therefore, a principal object of the present invention to provide an electromagnetic valve which is cheap and easy to assemble.

In order to attain the foregoing object, the present invention provides an electromagnetic valve which comprises a case having a cylindrical portion, a yoke having a large diameter portion and a small diameter portion, and a sleeve having at least two ports and receiving a valve member therein so as to be able to perform reciprocating motion, wherein the large diameter portion of the yoke is fluid-tightly pressed into the inner circumferential surface of the cylindrical portion of the case and the inner circumferential surface of the sleeve is fluid-tightly pressed onto the outer circumferential surface of the small diameter portion of the yoke.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PRESENT INVENTION

Figure 1:
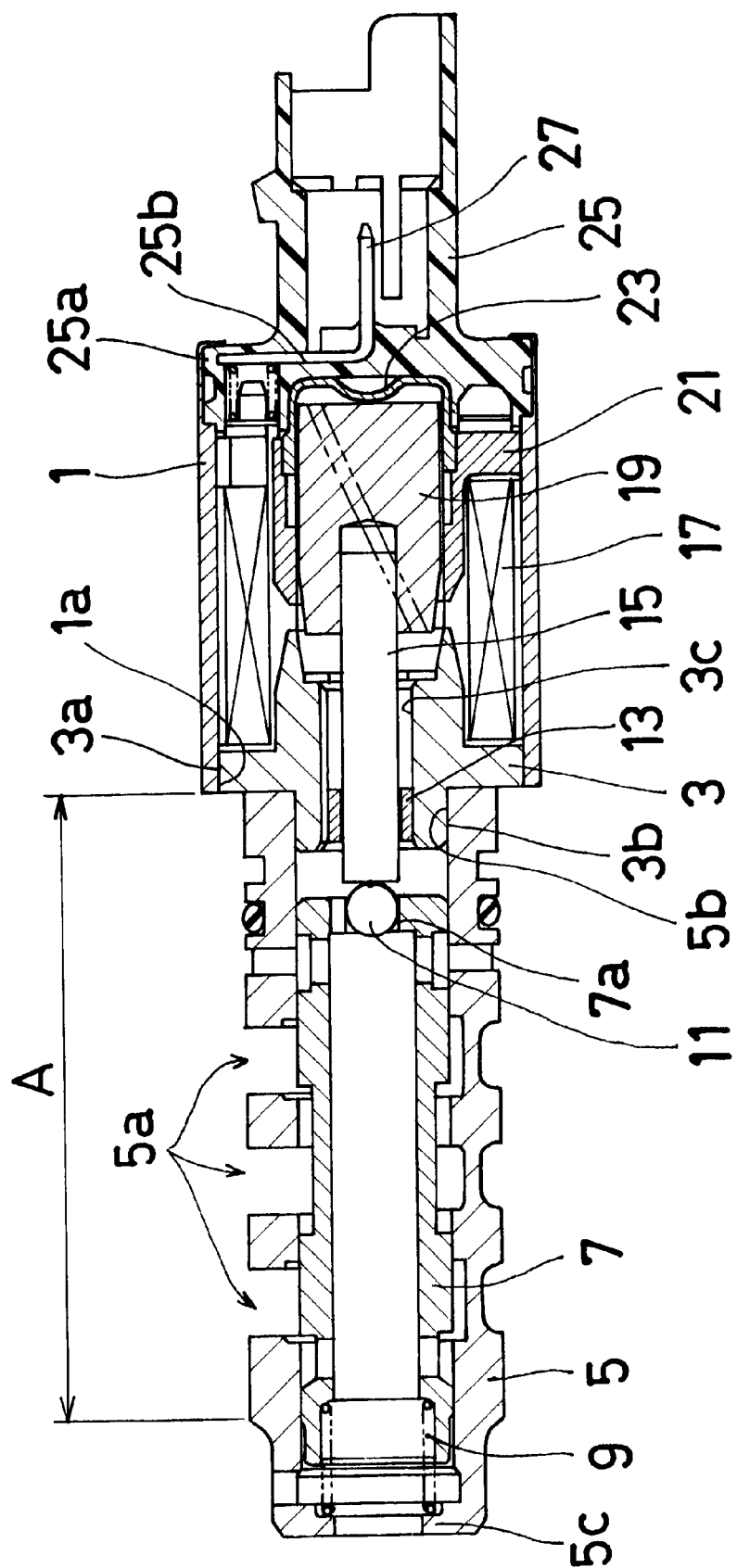
FIG. 1 shows a cross sectional view of an electromagnetic valve according to an embodiment of the present invention.

A preferred embodiment of the present invention is illustrated in FIG. 1. An electromagnetic valve shown in FIG. 1 is a linear type electromagnetic valve. This valve is used to control the pressure or the flow rate of the fluid for controlling a subject, such as, a valve timing control device or a vehicular automatic transmission and so on.

Referring to FIG. 1, a cylindrical case 1 is made of a magnetic material. A stepped cylindrical front yoke (yoke) 3 having a large diameter portion 3a and a small diameter portion 3b and the rear yoke 21 are disposed in the case 1. The front yoke 3 and the rear yoke 21 are made of a magnetic material. The outer diameter 3a of the front yoke 3 is snugly fitted by pressing into an inner circumferential surface 1a of the case 1 and the front yoke 3 if fluid-tightly fixed to the case 1. A coil 17 is disposed in the case 1 so as to nip between the front yoke 3 and the rear yoke 21 and is fixed to the case 1.

A plunger 19 made of magnetic material has a substantially column shape. The plunger 19 is fitted into a cylindrical inner surface formed on the rear yoke 21 so as to slide in the axial direction. A magnetic gap is formed between the right end surface of the front yoke 3 and the left end surface of the plunger 19. Accordingly, a magnetic circuit is formed by the case 1, the rear yoke 21, the plunger 19 and the front yoke 3.

A cylindrical sleeve 5 is snugly fitted by pressing into the small diameter portion 3b of the front yoke 3 at an inner circumferential surface 5b of its right end and is fluid-tightly fixed to the front yoke 3. A spool (a valve member) 7 is disposed in the inner bore of the sleeve 5 so as to be able to perform reciprocating motion. Three ports 5a which penetrate in the radial direction are formed on the sleeve 5, and each of the ports 5a is separated with a predetermined distance in the axial direction. The communication between two ports 5a can be switched in response to the axial position of the spool 7. Further, the opening area of each port 5a (located at the right side and the left side in FIG. 1) opened into the inner bore and adjusted in response to the axial position of the spool 7. The sleeve 5 is mounted on the subject (not shown) and controls the pressure or the flow rate of the fluid supplied to the subject of the control in response to the axial position thereof The spool 7 is in cylindrical shape having an inner bore and is made of a non-magnetic material. The spool 7 is provided with three circular grooves which are formed on the outer cirucmferential surface thereof. Each of the circular grooves is separated with a predetermined distance in the axial direction. The circular groove located at left side in FIG. 1 is communicated to the inner bore of the spool 7 through a plurality of communication holes formed on the spool 7. The circular groove located at right side in FIG. 1 is communicated to the inner bore of the spool 7 through a plurality of communication holes which are formed on the spool 7. The spool 7 is normally urged rightward by a spring 9 with one end supported on a seat portion 5c formed on the end of the sleeve 5 in FIG. 1. A ball 11 is snugly fitted by pressing into an opening 7a of the spool 7 which is formed on the right end thereof in FIG. 1.

A shaft 15 is snugly fitted by pressing into a hole which is formed on the left end of the plunger 19. The shaft 15 is coaxial with the plunger 19, and the left end of the shaft 15 is projected from the left end surface of the plunger 19. The projected left end of the shaft 15 penetrates into the penetrating hole 3c formed on the front yoke 3 while being slidably supported on a bush 13 snugly fitted into the penetrating hole 3c by pressing. The projecting left end of the shaft 15 projects into the sleeve 5 and generally contracts with the ball 11. Thereby, the plunger 19 is also generally urged rightward by the urging force of the spring 9 through the shaft 15 and the ball 11. Accordingly, the plunger 19 always moves with the spool 7 in one body.

A connector 25 is made of a resin and is riveted to the right end of the case 1 at a flange portion 25a formed on a left end thereof in FIG. 1. A terminal 27 is integrally molded into the connector 25 and is electrically connected to the coil 5. Thereby the amount of the current supplied to the coil 5 is controlled by connecting the terminal 27 to an electrical control device (not shown). Further, a concave portion 25b is formed on the right end of the connector 25, and a cup shaped stopper member 23 is disposed in the concave portion 25b. The stopper member 23 is disposed so as to contact with the right end of the plunger 19 in FIG. 1. Thereby, the stopper member 23 regulates the rightward movement of the plunger 19, and the plunger 19 is supported by the stopper member 23 in the diametrical direction.

The operation of the linear type electromagnetic valve with the above structure is described as follows. When the current is not supplied to the coil 17, the plunger 19 is urged rightward by the spring 9 to contact the stopper member 23. When the electrical control device (not shown) is operated and the current is supplied to the coil 17, a magnetic flux is generated in the magnetic circuit formed by the case 1, the rear yoke 21, the plunger 19 and the front yoke 3. Thereby, the plunger 19 is attracted toward the front yoke 3 by the attracting force generated by the magnetic flux in the axial direction and is moved leftward against the urging force of the spring 9 in FIG. 1. The axial position of the plunger 19 is determined by the balance of the attracting force with the urging force of the spring 9. Following the leftward movement of the plunger 19, the spool 7 also moves leftward. Accordingly, by means of the control of the amount of the current supplied to the coil 17, the axial attracting force applied to the plunger 19 can be adjusted and the axial position of the plunger 19, namely the axial position of the spool 7, is continually controlled. Thereby, the pressure or the flow rate of the fluid supplied to the subject of the control can be continually controlled.

In the electromagnetic valve of the above embodiment, the large diameter portion 3a is snugly fitted by pressing into the inner circumferential surface 1a of the case 1 and the front yoke 3 is fluid-tightly fixed to the case 1. Further, the cylindrical sleeve 5 is snugly fitted by pressing into the small diameter portion 3b of the front yoke 3 at the inner circumferential surface 5b of its right end and is fluid-tightly fixed to the front yoke 3. Accordingly, it is not necessary to form the stepped configuration (having the thin portion on inner circumferential surface 1a of the case 1), and the manufacturing or processing cost of the electromagnetic valve is decreased.

Further, since the case 1 is fluid-tightly fixed to the front yoke 3 by press-fitting and the sleeve 5 is fluid-tightly fixed to the front yoke 3 by press-fitting, it is not necessary to provide an additional seal member such as seal ring, for preventing the fluid from leaking outside the valve and for preventing the water or dust from entering into the valve. As a result, the costs of parts and the costs for assembling the electromagnetic valve is decreased. The diameter tolerance, and the thickness of the front yoke 3, the case 1 and the sleeve 5, the length of the press-fitting and so on are set to the enough value for satisfying the fixing function and the sealing function.

In FIG. 1, the area shown by the numeral A of the sleeve 5 has the same outer diameter as the outer circumferential surface on which three ports 5a are formed and which has to be sealed between the adjacent ports 5a by the cooperation with a part of the subject. The sleeve 5 is snugly fitted by pressing onto the small diameter portion 3b at one end of the area A. Namely, as the prior electromagnetic valve, a flange portion for riveting is not formed on the outer circumference of the sleeve 5. Thereby, the outer circumferential centerless method, which grinds without increasing the cost for the grinding process, can be used to grind the outer circumferential surface of the area A. Therefore, the cost for the grinding process of the sleeve 5 is reduced.

Figure 2:
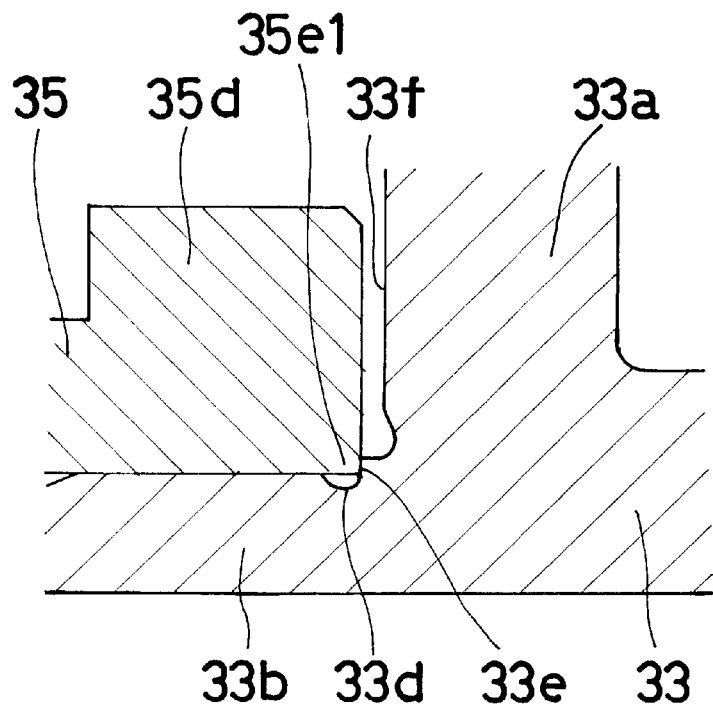
FIGS. 2 and 3 show partly cross sectional views of the press-fitting structure of an electromagnetic valve according to the other embodiment of the present invention.
Figure 3:
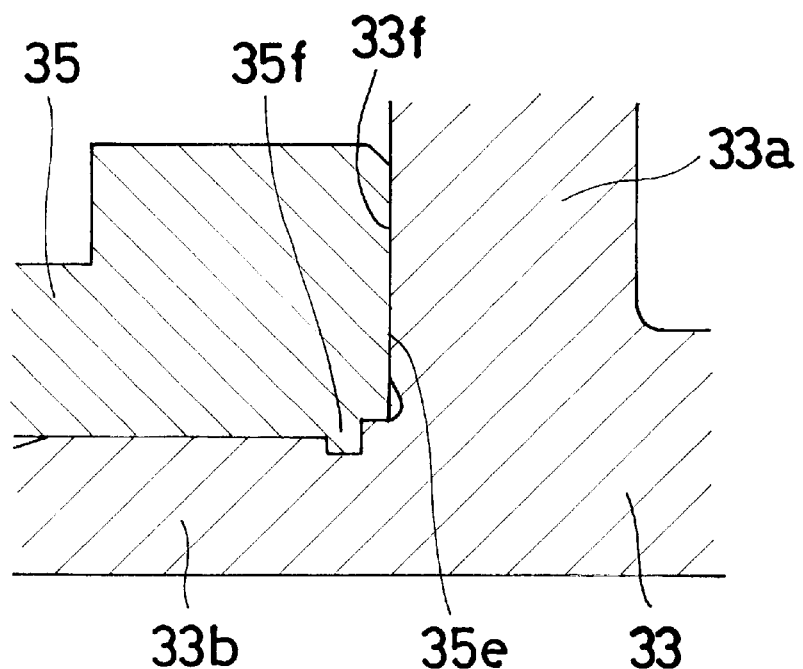

FIGS. 2 and 3 show the press-fitting structure between a sleeve 35 and a front yoke 33 according to the other embodiment of the present invention. In this embodiment, a circular groove 33d is formed on the outer circumferential surface of the small diameter portion 33b of the front yoke 33 which is adjacent to the left side surface 33f of the large diameter portion 33a being opposite to the sleeve 35. Further, a stepped portion 33e is formed on the outer circumferential surface of the small diameter portion 33b which is located between the circular groove 33d and the left side surface 33f of the large diameter portion 33a. The outer diameter of the stepped portion 33e is slightly larger than the inner diameter of the end portion 35d of the sleeve 35.

In this embodiment, when the end portion 35d of the sleeve 35 is snugly fitted by pressing onto the outer circumferential surface of the small diameter portion 33*b* of the front yoke 33, the inner edge portion 35*el* of the right end surface 35*e* of the sleeve 35 contacts with the stepped portion 33*e* as shown in FIG. 2. In this condition, when the press-fitting of the sleeve 35 is run, the inner edge portion 35*el* is deformed inward in the diametrical direction and is riveted into the circular groove 33*d* so as to form the riveting portion 35*f* biting into the circular groove 33*d* as shown in FIG. 3. Then, when the right end surface 35*e* of the sleeve 35 contacts with the left end surface 33*f* of the large diameter portion 33*a*, the press-fitting is completed. According to this embodiment, the rivet portion 35*f* is formed to prevent the sleeve 35 from coming out from the front yoke 33. Further, it prevents the fluid from leaking outside the valve and prevent the water or dust from entering into the valve.

In the embodiments mentioned above, the present invention is applied to a linear type electromagnetic valve. However, it also applies to other types electromagnetic valves such as an ON-OFF type electromagnetic valve.

The invention has thus been shown and described with reference to a specific embodiment, however, it should be understood that the invention is in no way limited to the details of the illustrates structures by changes and modifications may be made without departing from the scope of the appended claims.

What is claimed is:

1. An electromagnetic valve, comprising:

a case having a cylindrical portion, a yoke having a large diameter portion and a small diameter portion, and a sleeve having at least two ports and receiving a valve member therein so as to perform reciprocating motion, wherein the large diameter portion of the yoke is fluid-tightly pressed into the inner circumferential surface of the cylindrical portion of the case and the inner circumferential surface of the sleeve is fluid-tightly pressed onto the outer circumferential surface of the small diameter portion of the yoke, wherein a circular groove is formed on the outer circumferential surface of the small diameter portion of the front which is adjacent to the end surface of the large diameter portion being opposite to the sleeve, and wherein a stepped portion with an outer diameter larger than the inner diameter of the sleeve is formed on the outer circumferential surface of the small diameter portion located between the circular groove and the end surface of the large diameter portion.

* * * * *